United States Patent
Mellenthin

(10) Patent No.: US 9,321,404 B1
(45) Date of Patent: Apr. 26, 2016

(54) TRANSPORTATION SYSTEM FOR TANKS OF COMPRESSED GAS

(71) Applicant: Clifford F. Mellenthin, Hudson Oaks, TX (US)

(72) Inventor: Clifford F. Mellenthin, Hudson Oaks, TX (US)

(73) Assignee: Clifford F. Mellenthin, Hudson Oaks, TX (US)

( * ) Notice: Subject to any disclaimer, the term of this patent is extended or adjusted under 35 U.S.C. 154(b) by 0 days.

(21) Appl. No.: 14/723,457

(22) Filed: May 28, 2015

Related U.S. Application Data

(60) Provisional application No. 62/080,866, filed on Nov. 17, 2014.

(51) Int. Cl.
*F17C 13/08* (2006.01)
*B60R 7/04* (2006.01)
*B60R 7/08* (2006.01)

(52) U.S. Cl.
CPC . *B60R 7/043* (2013.01); *B60R 7/08* (2013.01); *F17C 13/084* (2013.01); *F17C 2205/0157* (2013.01); *F17C 2270/0178* (2013.01)

(58) Field of Classification Search
CPC ................................. B60R 7/043; F17C 13/084
See application file for complete search history.

(56) References Cited

U.S. PATENT DOCUMENTS

| | | | | |
|---|---|---|---|---|
| D367,960 S | * | 3/1996 | Werbesky, Jr. | D3/316 |
| 5,829,629 A | * | 11/1998 | Usher | B65D 81/107 220/23.91 |
| 6,042,130 A | * | 3/2000 | Souza | B62B 1/12 280/79.5 |
| 6,213,529 B1 | * | 4/2001 | Kurcz | B65D 71/0003 206/427 |
| 6,302,291 B1 | * | 10/2001 | McCleerey | B65D 25/22 206/501 |
| 6,386,559 B1 | * | 5/2002 | Souza | B60R 7/043 280/47.26 |
| 7,201,383 B2 | * | 4/2007 | Gibby | B62B 1/125 220/622 |
| 7,255,245 B2 | * | 8/2007 | Oliveira | F17C 1/04 220/586 |
| 7,316,435 B2 | * | 1/2008 | Leighton | A45C 11/00 150/154 |
| D564,619 S | * | 3/2008 | Cogswell, Jr. | D23/206 |
| 7,644,819 B2 | * | 1/2010 | Gill | B65D 25/102 206/446 |
| D611,566 S | * | 3/2010 | Brockington | D23/206 |
| 7,963,597 B2 | * | 6/2011 | Bostrom | A62B 9/04 248/313 |
| D641,064 S | * | 7/2011 | Cogswell, Jr. | D23/206 |
| 2008/0073355 A1 | * | 3/2008 | Akbar | B65D 29/00 220/562 |
| 2014/0263502 A1 | * | 9/2014 | Byham | B60R 7/043 224/275 |

FOREIGN PATENT DOCUMENTS

GB 2285797 A * 7/1995 ........... A45C 7/0077

* cited by examiner

*Primary Examiner* — Justin Larson

(57) ABSTRACT

A system to transport a cylindrical tank via a seat of a vehicle includes a body forming a hollow cavity configured to receive the cylindrical tank therein and a fastening device on the body and configured to secure the body to a seatbelt of the seat. The body has an elongated length configured to completely enclose the length of the cylindrical tank.

1 Claim, 6 Drawing Sheets

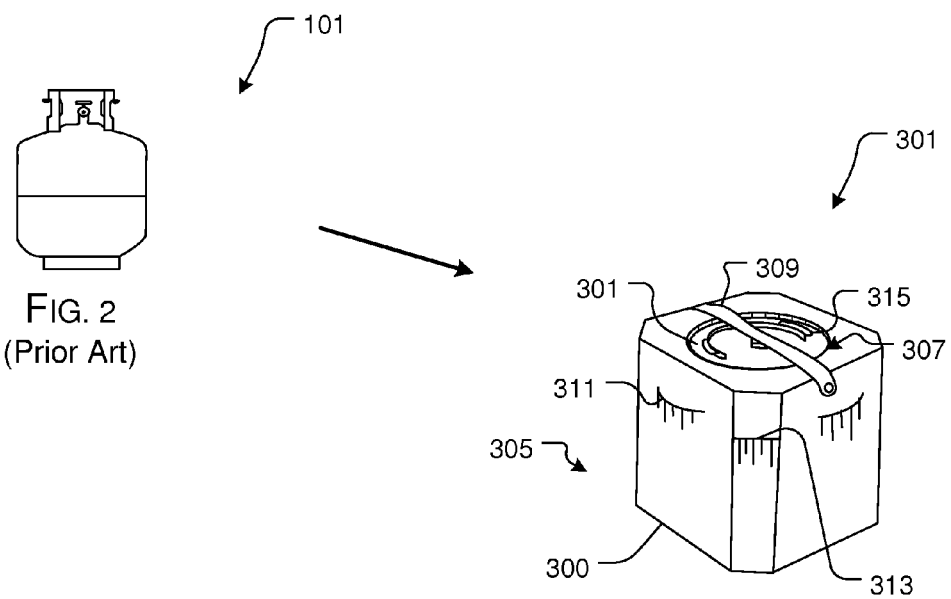
FIG. 2
(Prior Art)
FIG. 3
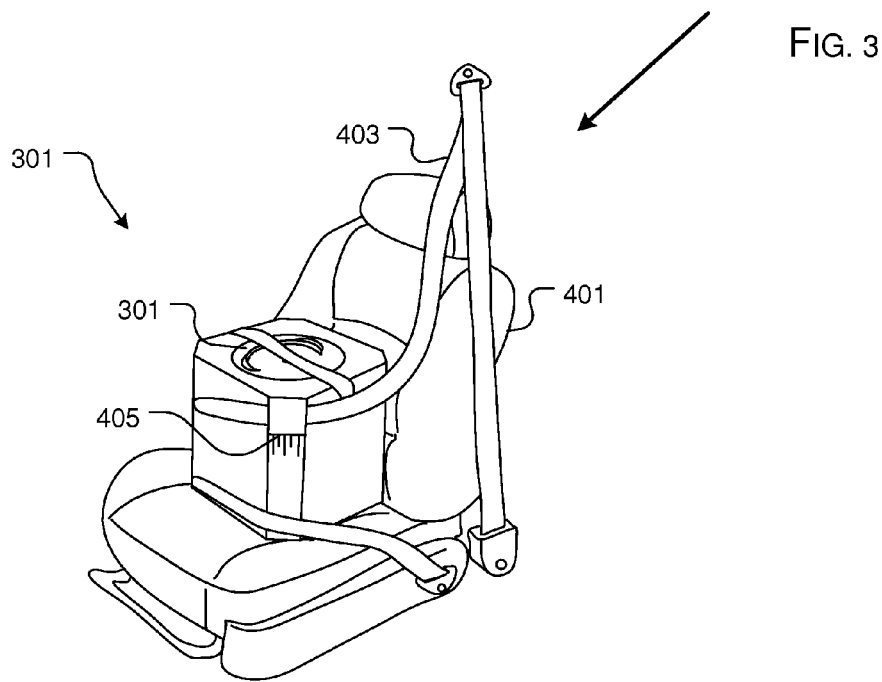
FIG. 4

TRANSPORTATION SYSTEM FOR TANKS OF COMPRESSED GAS

1. FIELD OF THE INVENTION

The present invention relates generally to transportation systems for portable tanks of compressed gas and specifically to portable propane tanks.

2. DESCRIPTION OF RELATED ART

Securing portable tanks of compressed gas is well known in the art. However, the transportation systems are generally used with commercial vehicles and not for residential vehicles. FIG. 1 depicts a front view of a conventional portable tank transportation system 101 having a container 105 configured to fit around the periphery of the tank 103. For example, container 105 could include a foam material configured to fit around the periphery of the outer surface of the tank 103. It should be understood that container 105 is configured to prevent the tank 103 from sliding or rolling during transportation but does not cover the entire tank 103.

A common disadvantage associated with system 101 is that the portion of the tank 103 is not covered by the container 105, which in turn can soil or tear the interior of a residential vehicle. Also, any exposed portion of the tank is susceptible to impact damage during transportation. Further, there exist no means to secure the container 105 to the seat of the vehicle.

Although great strides have been made in the area of portable tank transportation systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 2 is a conventional tank used to transport compressed gas;

FIG. 3 is an oblique view of a tank transportation system in accordance with a preferred embodiment of the present application;

FIG. 4 is an oblique view of the system of FIG. 3 secured to the interior of a transportation vehicle;

Figure 1:
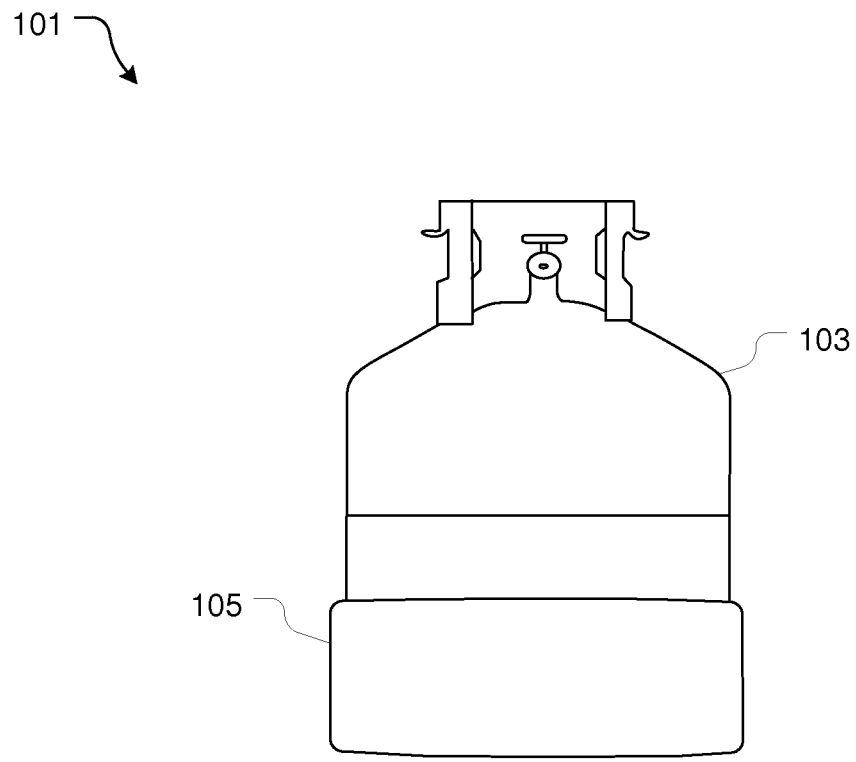
FIG. 1 is a front view of a conventional tank transportation system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional transportation systems for portable tanks of compressed gas. Specifically, the system of the present application is configured to provide secure transportation for portable tanks of compressed gas without damaging the interior of the transportation vehicle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIGS. 2-4 depict various views of a tank transportation system 301 configured to safely transport tank 103. It will be appreciated that the system 301 overcomes one or more of the above-listed problems commonly associated with conventional systems for transporting portable tanks of compressed gas.

Although discussed as transporting gas, it will be appreciate that the features of the systems discussed herein could be used to transport other types of containers in lieu of the exemplary gas tank.

Referring now to FIG. 3, in the contemplated embodiment, system 301 includes one or more of a container 305 configured to carry tank 101 therein. In the preferred embodiment, container 305 is composed of a shock absorbent material to reduce impact on the tank during transport.

Container 305 includes a body 300 that forms an opening 307 for receiving the tank 301. As shown, the body 300 is configured to peripherally surround the tank 103. One of the unique features believed characteristic of the present system 301 is the ability to completely surround the sides of the tank during transport, which in turn prevents unwanted tearing against, for example, the seats of the vehicle.

One additional feature unique to the present application is the use of a retaining device 309 for securing the tank 103 within the opening 307. In the preferred embodiment, the retaining device 309 is a strap that include one or more quick-release devices, e.g., hook-loop, clip, snap, and the like that is easily and rapidly removed from the sides of the body. The retaining device 309 is thus used to secure the tank during transport. It should be understood that the container 305 is tall enough to encompass the handles 315 of the tank 103. System 301 is further provided with one or more handles 311 positioned on the sides of the body for carrying the system 301 during transport to and from the vehicle.

FIG. 4 illustrates system 301 secured in position to a seat 401 of a vehicle during transportation. As shown, system 301 is further provided with a fastening device 405 configured to engage with a seat belt 403 of the vehicle. Thus, in accordance with a preferred embodiment of the present application, the fastening device 405 is an effective means to secure the tank 301 in a fixed position against the seat 401 via seatbelt 403.

Accordingly, one of the unique features believed characteristic of the present application is the use of a container tall enough to encompass the handles of the tank. It is appreciated that this feature eliminates the risk that the handles will damage the interior of a vehicle during transportation and reduces the risk of impact damage to the tank.

Another unique feature believed characteristic of the present application is the ability to secure the system with either or both of the lap and shoulder straps of a standard vehicular restraining belt.

Figure 5:
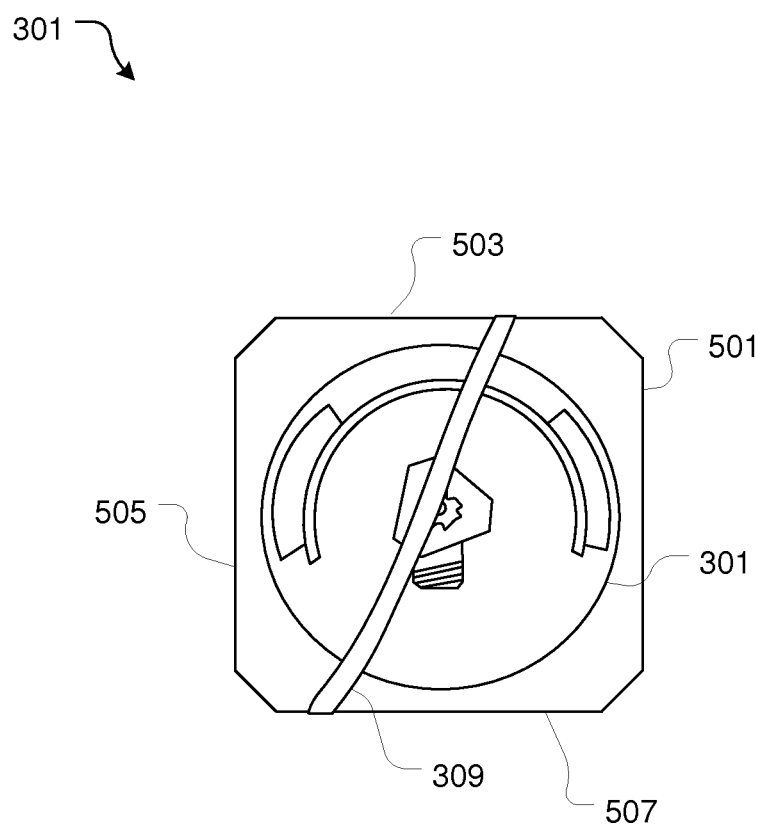
FIG. 5 is a top view of the system of FIG. 3.
Figure 6:
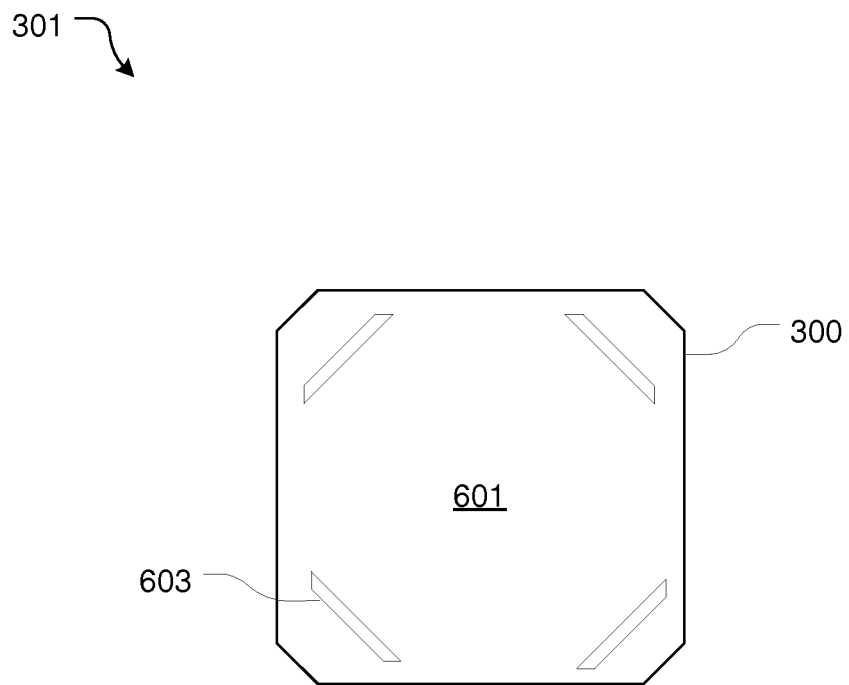
FIG. 6 is a bottom view of the system of FIG. 3.

Referring now to FIGS. 5 and 6, respective top and bottom views of system 301 are shown. As depicted body 300 includes four flat sides 501, 503, 505, and 507 with integral corners. During transport, the sides of the container are placed against the seat and the seatbelt is configured to engage with one or more fastening device secured the corners of the body. In FIG. 6, a bottom view of system 301 is shown. It will be appreciated that system 301 is further provided with a plurality of vents 603 in gas communication with the opening 307. It should be understood that the process of removing the tank from the opening can become burdensome due to the vacuum pressure created during the removal process. Accordingly, vents 603 are used to reduce, if not eliminate the vacuum pressure. In the contemplated embodiment, the vents travel from a bottom surface 601 of the body, through the thickness of the body and to the opening 307.

Figure 7A:
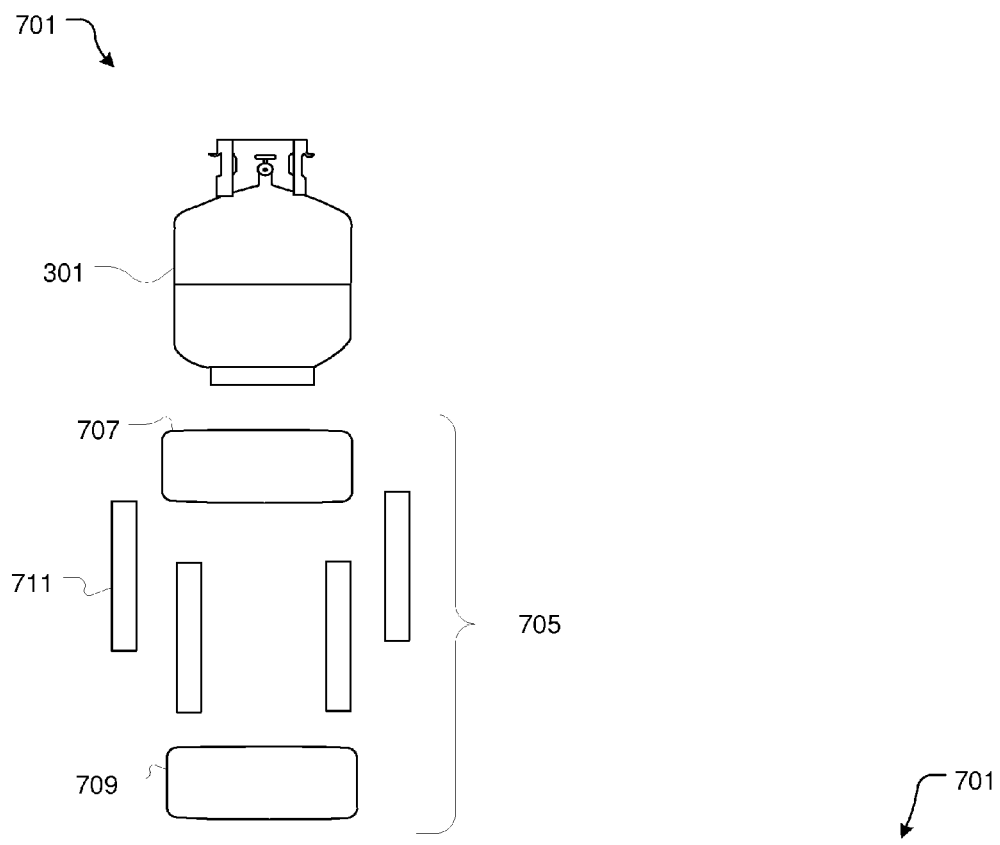
FIGS. 7A and 7B are respectively exploded and assembled front views of an alternative embodiment of the system of FIG. 3.
Figure 7B:
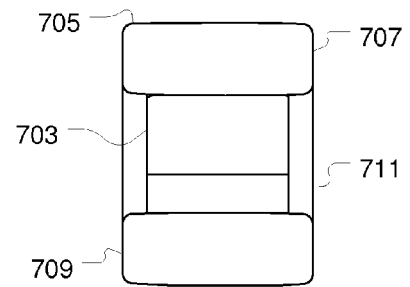

Referring now to FIGS. 7A and 7B, a front view of an alternative embodiment of the system of FIG. 3 is shown. In this embodiment a system 701 comprises a container 705 that composed of various elements and is manufactured with shock absorbent material. Container 705 includes a top component 707 and a bottom component 709 connected by a plurality of posts 711 that form a cavity around the tank 103. It is appreciated that this alternative embodiment overcomes one or more of the above-discussed problems commonly associated with conventional transportation systems for portable tanks of compressed gas while conserving material and manufacture costs. As shown in FIG. 7B, the posts 711 are configured to engage with the top and bottom components and provide rapid disassembly and assembly means to secure the tank.

Figure 8:
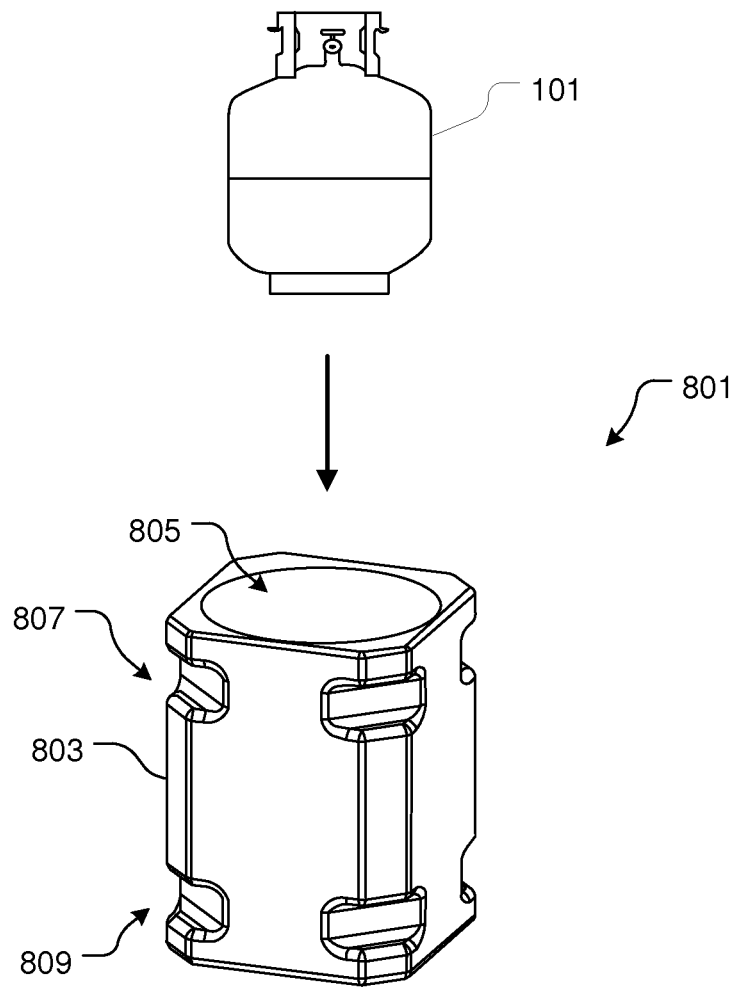
FIG. 8 is an oblique view of a tank transportation system in accordance with an alternative embodiment of the present application.

In FIG. 8, an alternative embodiment of system 301 and 701 is shown. System 801 is substantially similar in form and function to the system discussed above and incorporates one or more of the features discussed above, although not shown.

System 801 includes a body 803 that forms a rectangular shape with four sides and four corners. The body 803 forms a hollow cavity 805 configured to receive tank 103 therein. Disposed on the corners of body 803 are a plurality of notches 807, 809 configure to engage with the seatbelt of the vehicle. Accordingly, during transport, the notches 807, 809 secure the tank 103 to the seat via the seatbelt.

In one contemplated embodiment, body 803 is hollow, thus having an interior wall configured to snugly engage with tank 103 and a spaced apart exterior wall that engages with the seat and the seatbelt via notches 807, 809.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A container to transport a cylindrical tank on a vehicle seat, the container comprising:
    a hollow body defined by interior and exterior spaced apart walls, wherein the interior wall defines a cylindrical hollow cavity for concealing an entire tank therein, and wherein the exterior wall forms a rectangular shape with four sides and four corners;
    an open top through which a tank is inserted into and removed from the hollow cavity;
    and a plurality of notches in each corner, wherein each notch is configured to partially surround and engage with a seatbelt of the vehicle.

* * * * *